(12) United States Patent
Pontanari et al.

(10) Patent No.: US 8,348,801 B2
(45) Date of Patent: Jan. 8, 2013

(54) ELECTRONIC DIFFERENTIAL LOCK ASSEMBLY

(75) Inventors: Marco Pontanari, Pombia (IT); Marco Bassi, Novate Milanese (IT); Giovanni Bellomi, Novara (IT); Roberto Gianone, Barengo (IT)

(73) Assignee: Meritor Heavy Vehicle Systems Cameri SpA, Cameri (IT)

( * ) Notice: Subject to any disclaimer, the term of this patent is extended or adjusted under 35 U.S.C. 154(b) by 1710 days.

(21) Appl. No.: 10/543,080

(22) PCT Filed: Jan. 31, 2003

(86) PCT No.: PCT/IT03/00044
§ 371 (c)(1),
(2), (4) Date: Jul. 21, 2005

(87) PCT Pub. No.: WO2004/068002
PCT Pub. Date: Aug. 12, 2004

(65) Prior Publication Data
US 2006/0247087 A1    Nov. 2, 2006

(51) Int. Cl.
*F16H 48/20* (2012.01)
(52) U.S. Cl. .................. 475/231; 475/240
(58) Field of Classification Search ........... 475/231, 475/237, 249, 150, 240, 241; 192/84.92
See application file for complete search history.

(56) References Cited

U.S. PATENT DOCUMENTS

| 2,459,870 | A |   | 1/1949  | Cook |
|-----------|---|---|---------|------|
| 4,561,520 | A | * | 12/1985 | Fogelberg ............... 180/247 |
| 4,662,499 | A | * | 5/1987  | Jordan .................. 192/82 T |
| 5,030,181 | A | * | 7/1991  | Keller .................. 192/84.92 |
| 6,063,000 | A | * | 5/2000  | Sugimoto ............... 475/231 |
| 6,886,425 | B2| * | 5/2005  | Petzold ................ 192/84.92 |

FOREIGN PATENT DOCUMENTS

| DE | 8633084  | 4/1987 |
| DE | 3808066  | 9/1988 |
| FR | 1402032  | 6/1965 |
| JP | 5812826  | 1/1983 |
| JP | 2502747  | 8/1990 |
| JP | 56108949 | 2/2010 |

* cited by examiner

*Primary Examiner* — David D Le
*Assistant Examiner* — Derek D Knight
(74) *Attorney, Agent, or Firm* — Carlson, Gaskey & Olds, PC

(57) ABSTRACT

An electronic differential lock assembly includes a shift collar that is movable in response to an electronic signal from an unlocked position where axle shaft speed differentiation under predetermined conditions is permitted to a locked position where a pair of axle shafts are fixed for rotation together. Speed differentiation is provided by a differential that includes a differential gear assembly supported within a differential case. A coil surrounds the shift collar and is selectively energized to move the shift collar from the unlocked position to the locked position. The shift collar is splined to one of the axle shafts and is selectively splined to the differential case to lock the axle shafts together. The electronic differential lock assembly includes a return spring that automatically disengages the shift collar from the differential case once the coil is no longer energized.

12 Claims, 6 Drawing Sheets

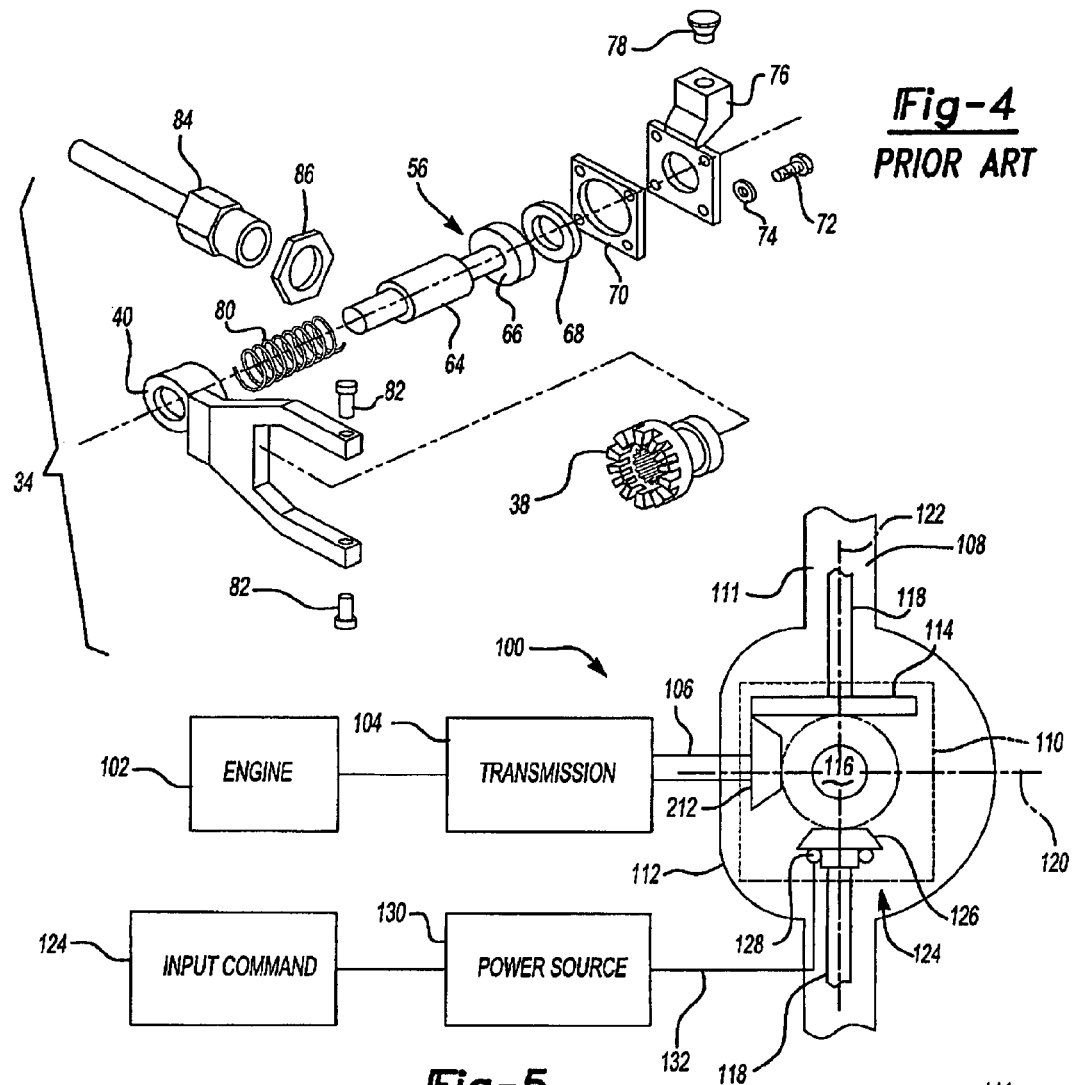
Fig-4
PRIOR ART
Fig-5
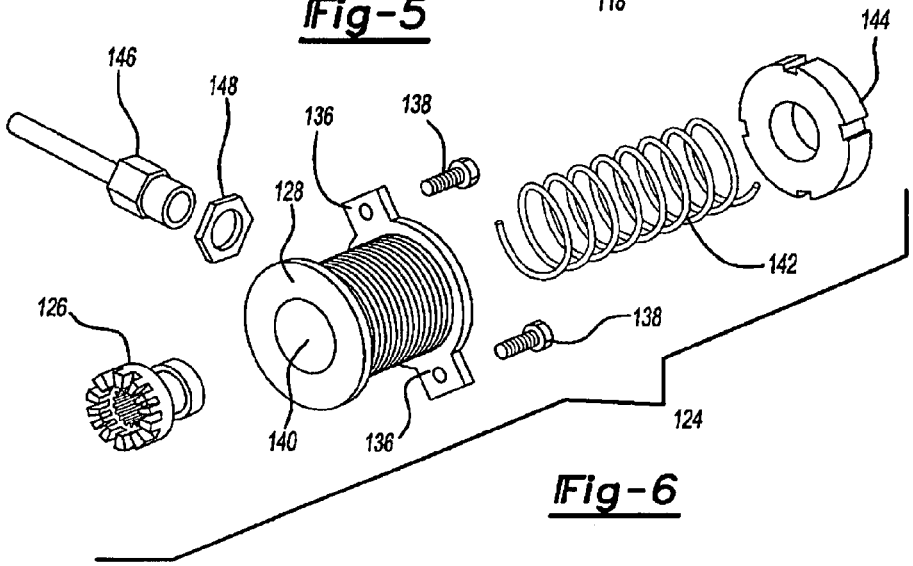
Fig-6

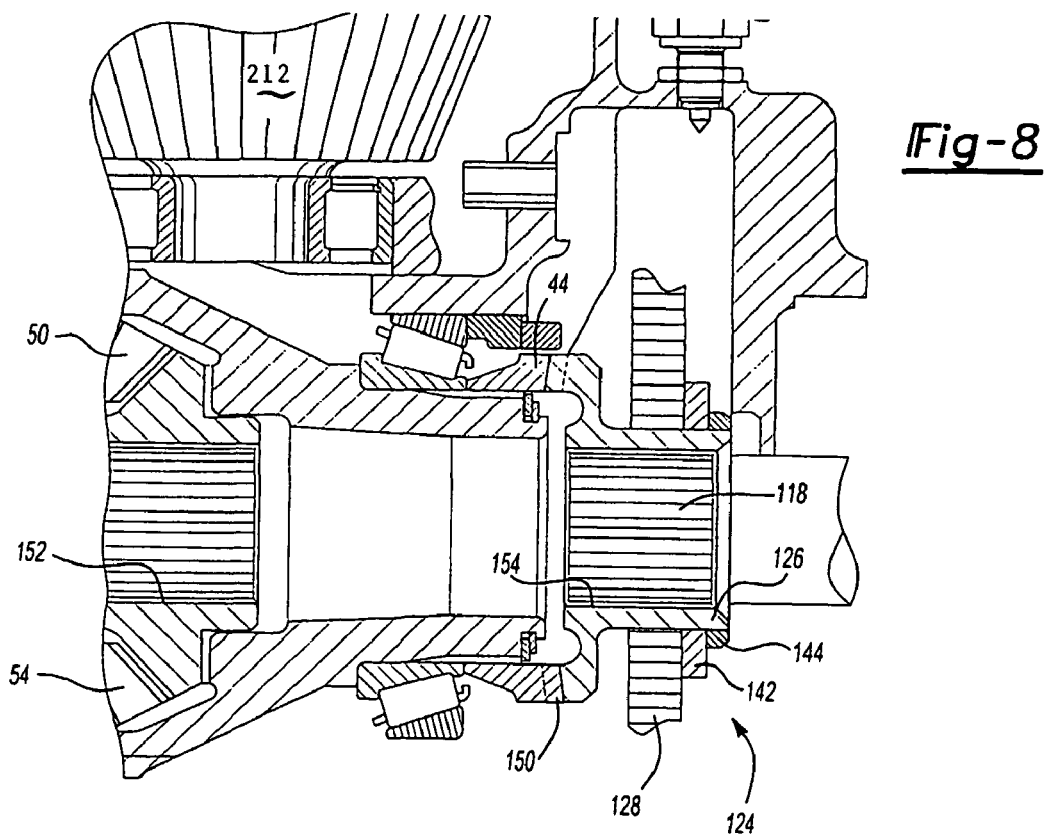
Fig-8
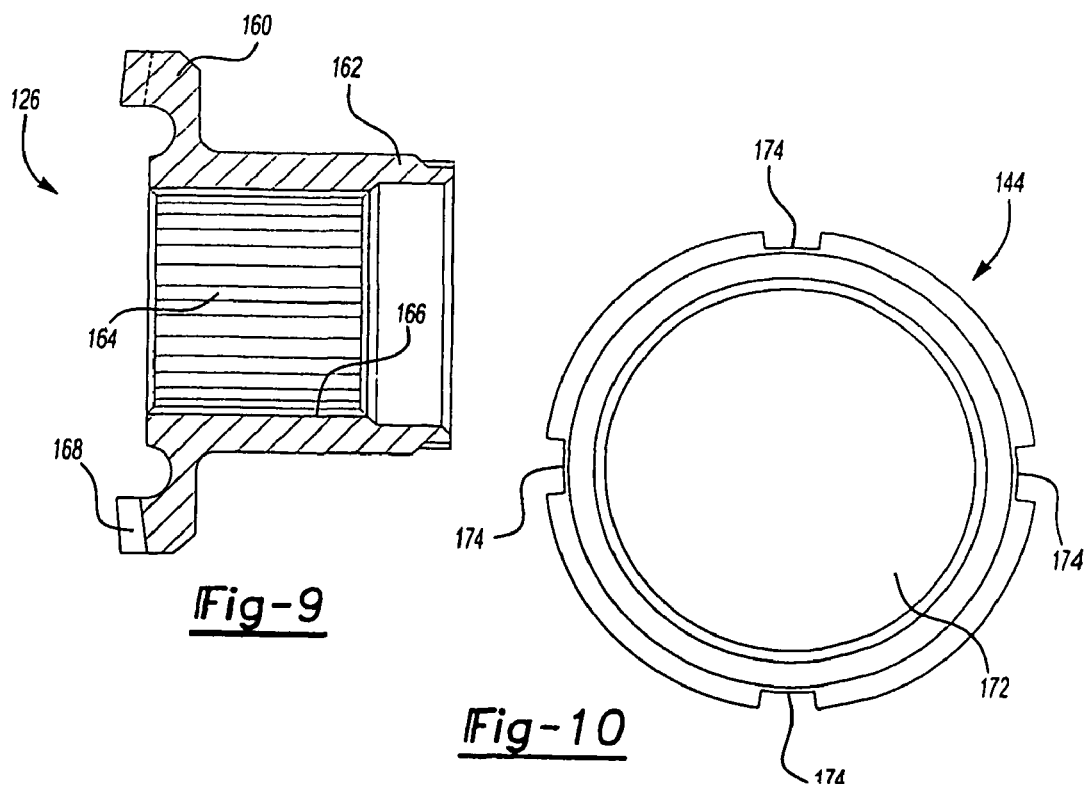
Fig-9
Fig-10

ELECTRONIC DIFFERENTIAL LOCK ASSEMBLY

BACKGROUND OF THE INVENTION

This invention relates to a differential locking assembly that utilizes an electronic coil to actuate a differential lock shift collar.

Vehicle drive axles typically include a pair of axle shafts for driving vehicle wheels. The drive axle uses a differential to control input speed and torque to the axle shafts. Under ideal conditions, when the vehicle is driven along a straight path, the wheels will be turning at approximately the same speed and the torque will be equally split between both wheels. When the vehicle negotiates a turn, the outer wheel must travel over a greater distance than the inner wheel. The differential allows the inner wheel to turn at a slower speed than the outer wheel as the vehicle turns.

Power is transmitted from a vehicle drive shaft to a pinion gear that is in constant mesh with a differential ring gear. The ring gear is bolted to a differential housing or case that turns with the ring gear. A differential spider having four (4) support shafts orientated in the shape of a cross, has four (4) differential pinion gears. One pinion gear is supported for rotation on each support shaft. Power is transferred from the differential housing to side gears that are splined to the axle shafts. The side gears are in constant mesh with the side differential pinion gears. The outer ends of the axle shafts are bolted to the brake drum hubs to which the wheels are also bolted.

When the vehicle is driven in a straight path, the ring gear, differential housing, spider, and differential pinion gears all rotate as one unit to transfer power to the axle shafts. There is no relative movement between the differential pinion gears and the side gears. When the vehicle turns, the differential pinion gears rotate on their respective shafts to speed up the rotation of one axle shaft while slowing the rotation of the other axle shaft.

Often the differential includes a differential locking mechanism. When there are poor road conditions, i.e., slippery or rough surfaced roads, the locking mechanism allows maximum wheel and tire traction for improved control. If the differential does not have a locking mechanism and one tire is on ice, all of the torque and speed will be transferred to the wheel on ice. Thus, the tire just spins on the ice and the vehicle is prohibited from traveling forward. A locking mechanism allows the axle shafts to rotate at the same speed while transferring all available torque to the tire not on the ice. If the tractive effort at this tire is sufficient, the vehicle can be moved off of the ice. When the differential is locked, power is transmitted through the locked differential housing, gearing, and axle shafts rather than through the differential gearing only.

One type of differential locking mechanism is comprised of an air actuated shift collar that locks the differential housing to the axle shafts. An air operated shift fork cooperates with the shift collar to engage or disengage the locking mechanism via a driver-controlled switch. In this configuration, one of the axle shafts has two sets of splines. An inner set of splines, closest to the differential, is engaged with one differential side gear, while an outer set of splines cooperates with the shift collar. The shift collar, although engaged with the outer splines at this time, is not engaged with the differential casing, thus the outer splines will rotate at the same speed as this side gear when the main differential is in an unlocked or disengaged position allowing the main differential to operate in a normal manner.

When the driver-controlled switch is activated, air pressure causes shift linkage to move the shift collar towards the differential. This allows the collar to engage with the differential casing, as well as remaining engaged with the axle shaft outer splines. Power transfer through the differential is now achieved through the locked differential casing, gearing, and both axle shafts together, rather than through the differential gearing alone.

Some disadvantages with the air actuation method are the significant number of components that are required, leakage, and component wear. The significant number of components that are required to operate this system increase assembly time and drive up the overall system cost. Requiring an air connect to actuate the system introduces possible air leaks to the system, which can lead to inadequate system performance. Further, the differential gearing, axle shafts, and shift collar operates in an oil-lubed environment and the additional components for the air actuation method increase the risk of oil leaks in the system. Further, repeated engagements and disengagements between the shift fork and shift collar, especially if engaged at high wheel speeds, can lead to premature component wear as well as introducing premature wear onto related components such as the differential gearing.

Thus, it is desirable to have a simplified actuating mechanism for a differential lock that reduces the overall number of components, operates more efficiently, and is more cost effective, as well as overcoming the other above-mentioned deficiencies with the prior art.

SUMMARY OF THE INVENTION

A differential locking mechanism includes a clutch or shift collar that is movable in response to an electronic signal from an unlocked position where axle shaft speed differentiation under predetermined conditions is permitted to a locked position where axle shaft speed differentiation is not permitted. The differential locking mechanism is incorporated into a drive axle assembly that includes a differential having a differential gear assembly supported within a differential case. A pair of axle shafts are driven by the differential gear assembly, which receives driving input from a ring and pinion gear set coupled to a drive shaft. An electronic actuator generates an electronic signal to move the shift collar from the unlocked position to the locked position.

Preferably, the electronic actuator comprises a coil that surrounds a portion of the shift collar. The coil is selectively energized in response to an input command to lock the differential. When the coil is energized, the shift collar is moved in an inboard direction, toward the differential, to engage the differential case, which locks the differential. A resilient member, such as a spring, for example, automatically disengages the shift collar from the differential case and moves the shift collar back to the unlocked position when the coil is not energized.

In one disclosed embodiment, the shift collar includes an inboard end having a splined surface for selective engagement with a mating splined surface on the differential case and an outboard end, which is surrounded by the coil. Preferably, the outboard end is smaller in diameter than the inboard end. The outboard end includes a splined bore in constant engagement with a mating splined surface on one of the axle shafts. A washer is mounted to the outboard end of the shift collar. The resilient member reacts between the washer and the coil to return the shift collar to the unlocked position.

The method for controlling the differential lock assembly includes the following steps: energizing the coil surrounding the shift collar; and in response to the coil being energized, moving the shift collar from the unlocked position where speed differentiation between the pair axle shafts is permitted under predetermined conditions to a locked position where both of the axle shafts rotate at a common speed by fixing the shift collar to the differential case.

The subject invention provides a simplified and effective differential lock that significantly reduces the number of components from traditional designs, reduces assembly time, and reduces cost. These and other features of the present invention can be best understood from the following specifications and drawings, the following of which is a brief description.

BRIEF DESCRIPTION OF THE DRAWINGS

FIG. 4 is an exploded view of the differential locking mechanism of FIG. 3.

FIG. 5 is a schematic view of a vehicle powertrain with a drive axle having a differential incorporating the subject invention.

FIG. 6 is an exploded view of the inventive differential locking mechanism.

FIG. 8 is a view similar to that of FIG. 7 but shown in an engaged position.

FIG. 9 is cross-sectional view of the shift collar shown in FIG. 6.

FIG. 10 is an overhead view of the washer shown in FIG. 6

DETAILED DESCRIPTION OF A PREFERRED EMBODIMENT

Figure 1:
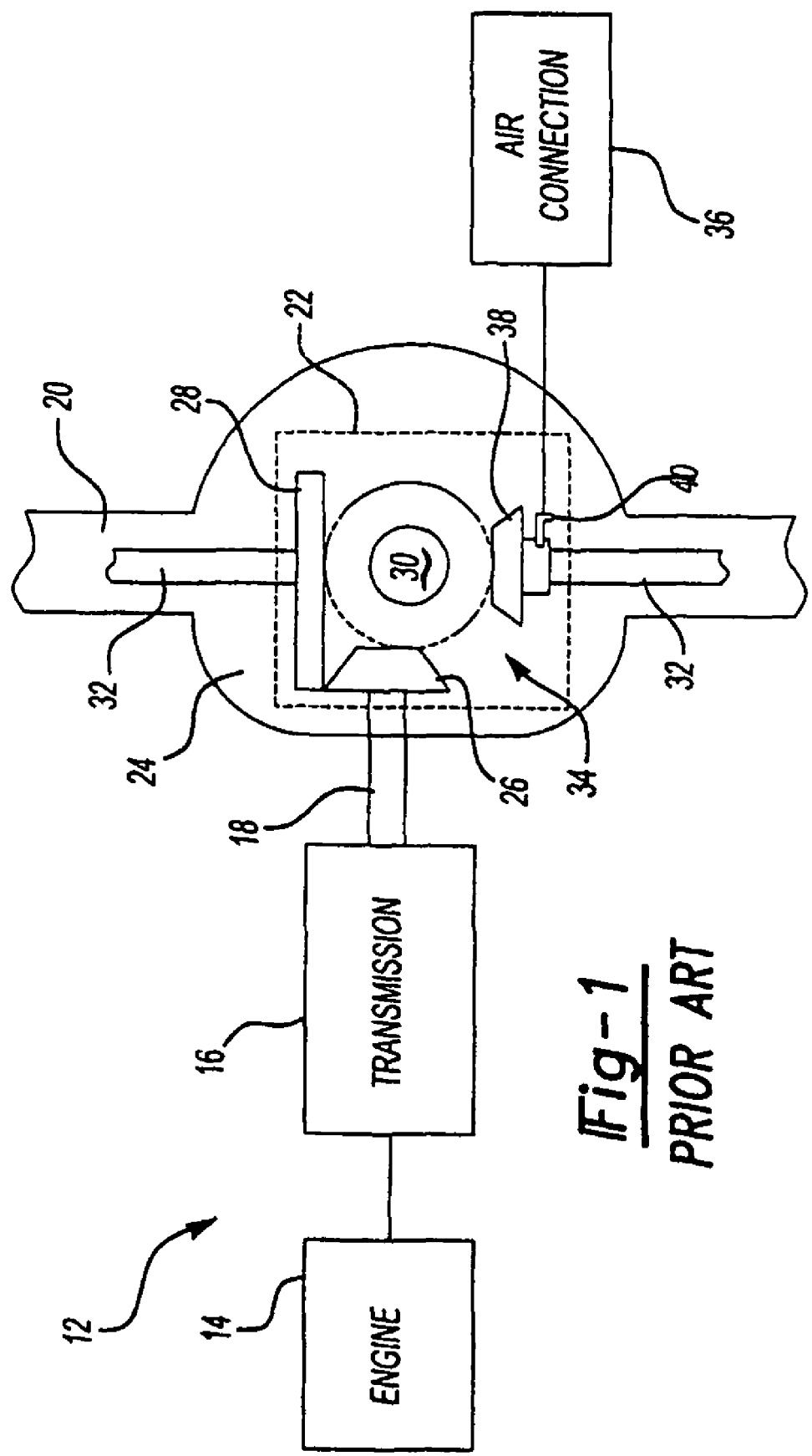
FIG. 1 is a schematic view of a vehicle powertrain with a traditional differential locking mechanism.

A traditional powertrain with an air-actuated differential locking mechanism is shown generally at 12 in FIG. 1. The powertrain 12 includes an engine 14, transmission 16, and drive shaft 18 that is coupled to a drive axle 20. The drive axle 20 includes a carrier 22 positioned within an axle housing 24 as known. The carrier 22 includes a pinion gear 26, operably coupled to the drive shaft 18, and which is in driving engagement with a ring gear 28. The ring gear 28 drives a differential 30, which in turn drives a pair of axle shafts 32 that drive the vehicle wheels (not shown).

The differential 30 includes a differential locking mechanism, shown generally at 34, which is actuated via an air supply connection 36. The differential locking mechanism 34 is movable between an unlocked position where axle shaft speed differentiation is permitted and a locked position where the axle shafts are locked together to rotate at a common speed. The differential locking mechanism 34 includes a shift collar 38 and an air actuated shift fork 40.

Figure 2:
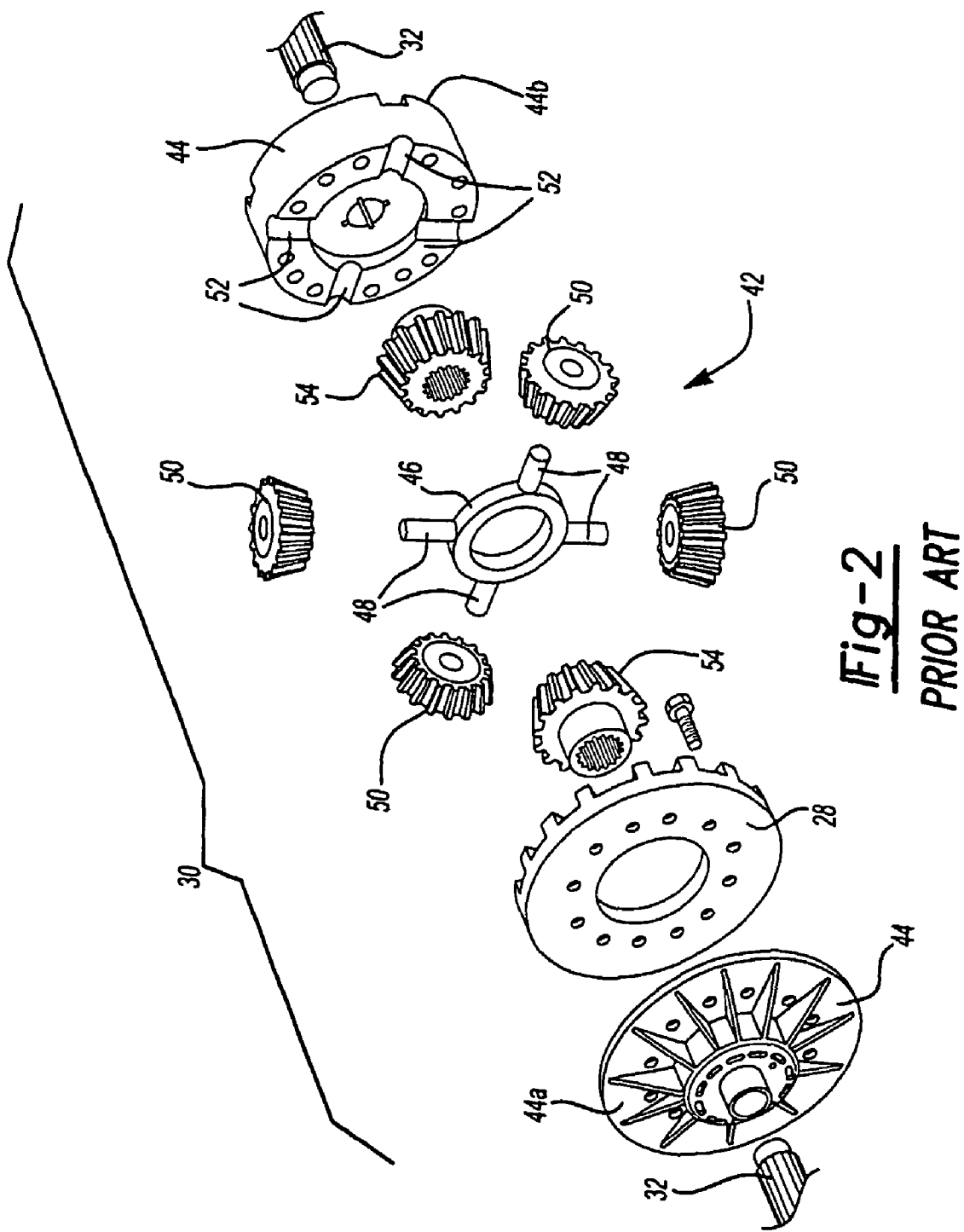
FIG. 2 is an exploded view of a traditional differential for a drive axle.

As shown in FIG. 2, the differential 30 includes a differential gear assembly, shown generally at 42, and a two-piece differential housing case 44. The two-piece differential case 44 includes a flange case half 44a that is attached to the ring gear 28 with a plurality of fasteners (not shown) such that the flange case half 44a and ring gear 28 rotate together as a single unit. The differential gear assembly 42 includes a differential spider 46 that has four (4) support shafts 48 orientated in the shape of a cross and has four (4) differential pinion gears 50. One differential pinion gear 50 is supported for rotation on each support shaft 48. The second piece of the two-piece differential case 44 comprises a plain case half 44b that includes four (4) slots 52 (only three (3) are shown). Each of the support shafts 48 is received within one of the slots 52 and the plain case half 44b is attached to the flange case half 44a with a plurality of fasteners (not shown). The differential gear assembly 42 also includes a pair of side gears 54 that are in meshing engagement with the differential pinion gears 50. One side gear 54 is splined to each axle shaft 32.

Power is transferred from the pinion gear 26 to the differential case 44 to the axle shafts 32 via the side gears 54. The side gears 54 are in constant mesh with the differential pinion gears 50. When the vehicle is driven in a straight path, the ring gear 28, differential case 44, differential spider 46, and differential pinion gears 50 all rotate as one unit to transfer power to the axle shafts 32 via the side gears 54. There is no relative movement between the differential pinion gears 50 and the side gears 54. When the vehicle turns, the differential pinion gears 50 rotate on their respective shafts 48 to speed up the rotation of one axle shaft 32 while slowing the rotation of the other axle shaft 32.

For adverse road conditions, the differential locking mechanism 34 is actuated to provide maximum wheel and tire traction for improved control. The locking mechanism 34 allows the axle shafts 32 to rotate at the same speed while transferring all available torque to the tire supported on the higher friction surface. For example if the tires at one end of the axle 20 were supported on an icy surface with the tire on the opposite end of the axle being supported on pavement, all available torque would be transferred to the tires on the pavement. If the tractive effort at these tires is sufficient, the vehicle can be moved off of the ice. When the differential 30 is locked, power is transmitted through the locked differential case 44, differential gear assembly 42, and axle shafts 32 rather than through the differential gear assembly 42 only.

Figure 3:
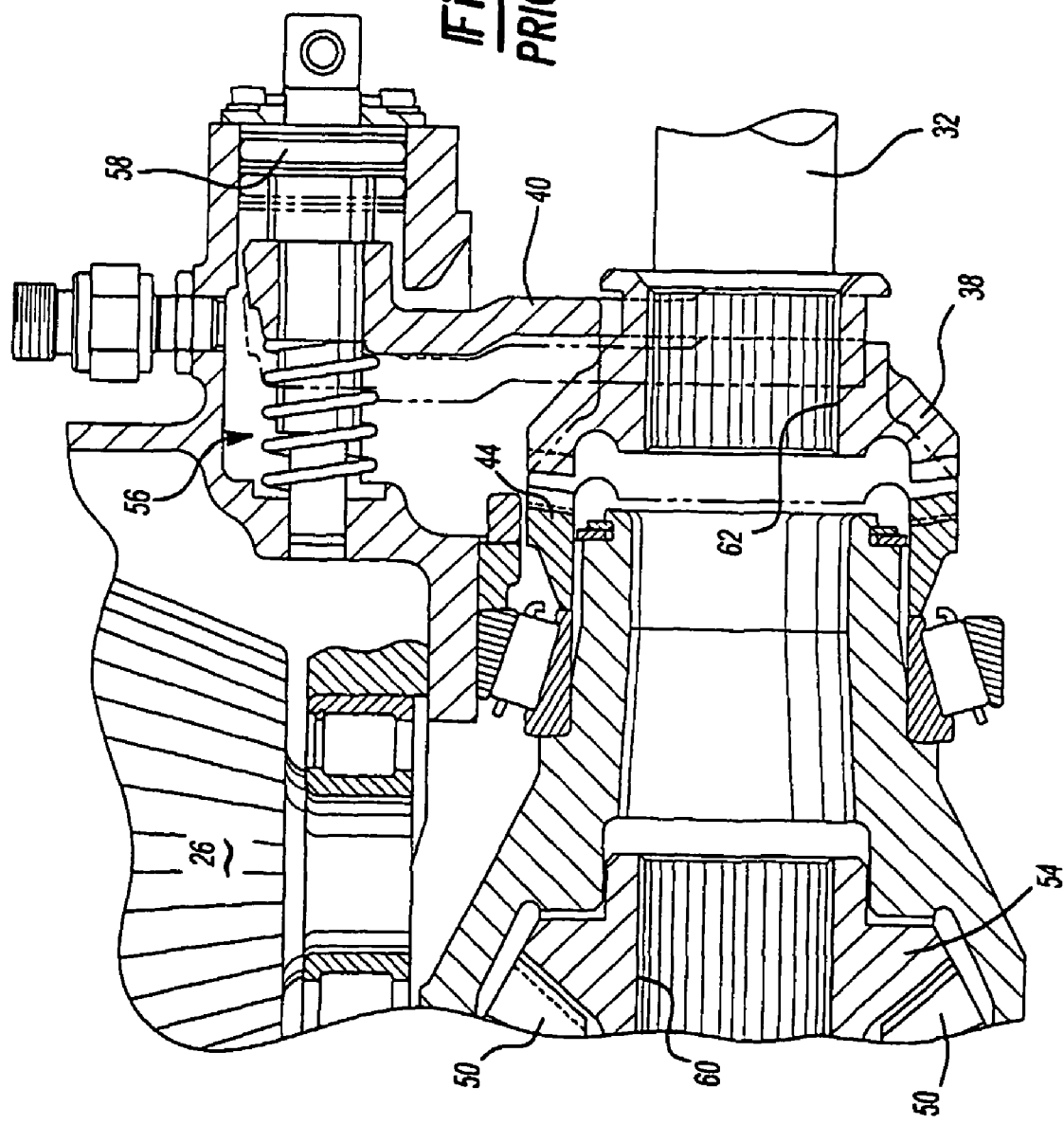
FIG. 3 is a cross-sectional view, partially broken away, of a traditional differential locking mechanism showing engaged and disengaged positions.

As described above and as shown in greater detail in FIG. 3, the traditional differential locking mechanism 34 includes the air actuated shift collar 38 that locks the differential case 44 to the axle shafts 32. The air operated shift fork 40 cooperates with the shift collar 38 to engage or disengage the locking mechanism 34 via a driver controlled switch (not shown). A push rod and spring assembly, shown generally at 56, are activated pneumatically via an air connect 58.

The shift collar 38 is locked to the differential case 44 in the following manner. One of the axle shafts 32 includes an inboard set of splines 60, closest to the differential 30, and an outboard set of spines 62. The inboard set of splines 60 are engaged with one differential side gear 54, while the outboard set of splines 62 cooperate with the shift collar 38. The shift collar 38, although engaged with the outboard set of splines 62 in an unlocked position (shown in solid lines in FIG. 3), is not engaged with the differential case 44, thus the outboard set of splines 62 will rotate at the same speed as the respective side gear 54 when the differential 30 is in an unlocked or disengaged position allowing the main differential to operate in a normal manner.

When the driver controlled switch is activated, air pressure causes the push rod and spring assembly 56 to move the shift collar 38 towards the differential 30 with the shift fork 40. This allows the shift collar 38 to engage with the differential case 44, while still remaining engaged with the axle shaft outboard set of splines 62 to achieve the locked position (shown in dashed lines in FIG. 3). Power transfer through the differential 30 is now achieved through the locked differential case 44, differential gear assembly 42, and both axle shafts 32 together, rather than through the differential gear assembly 42 alone.

An exploded view of the traditional differential locking mechanism 34 showing the shift fork 40, shift collar 38, and push rod and spring assembly 56 is shown in FIG. 4. The push rod and spring assembly 56 includes a push rod 64 with a piston 66, o-ring 68, and gasket 70 supported on one end. Four (4) cap screws 72 and four (4) associated washers 74 (only one set is shown) attach an air cylinder cover 76 with associated plug 78 to the gasket 70. A spring 80 surrounds an opposite end of the push rod 64 and reacts between the piston 66 and shift fork 40. A pair of pins 82 cooperate with the shift fork 40 to maintain proper orientation. A microswitch 84 and associated attachment nut 86 are also included in the differential locking mechanism 34 to monitor and inform the driver of the status of the differential 30. Thus, over twenty (20) separate components are required to operate a traditional differential locking mechanism.

This significant number of components in addition to increasing material costs makes assembly more difficult, which increases assembly time and also adds to the overall cost. Further, requiring an air connect to actuate the system introduces possible air leaks to the system, which can lead to inadequate system performance. Also, the differential gear assembly 42 operates in an oil-lubed environment and the air actuation increases the risk of oil leaks in the system. Further, repeated engagement and disengagements between the shift fork 40 and shift collar 38, especially if engaged at high speeds, can lead to premature component wear as well as introducing premature wear onto related components such as the differential gear assembly 42.

The subject invention provides an improved locking mechanism that significantly reduces the number of components and reduces overall cost and assembly time. A powertrain incorporating the subject invention is shown generally at 100 in FIG. 5. The powertrain 100 includes an engine 102, transmission 104, and drive shaft 106 that is coupled to a drive axle 108. The drive axle 108 includes a carrier 110 positioned within an axle housing 112 as known. It should be understood that the axle housing 112 includes housing portions that substantially enclose the axle shafts 118 and the carrier 110 within the housing 112. Additionally, the housing 112 can be formed as a single piece or can be formed from multiple pieces that are attached together to form the complete axle and carrier housing.

The carrier 110 includes a pinion gear 212, operably coupled to the drive shaft 106, and which is in driving engagement with a ring gear 114. The ring gear 114 drives a differential 116, which in turn drive a pair of axle shafts 118 that drive the vehicle wheels (not shown). The pinion gear 212 defines a longitudinal axis 120 and the axle shafts 118 define a lateral axis 122 that is transverse to the longitudinal axis 120. It should be understood that the differential 116 includes similar components and operates in a similar manner to that described with regard to differential 30 above and shown in FIG. 2.

The differential 116 includes a differential locking mechanism, shown generally at 124, which includes a shift collar 126 that is electronically actuated via a coil 128. The coil 128 is comprised of a coiled wire that surrounds a portion of the shift collar 126. The coil 128 is connected to a power source 130, such as a battery, that selectively energizes the coil 128 via an electronic signal 132. When the coil 128 is energized via an input command 134 from a driver or other input source, the shift collar 126 acts as an electromagnet and can be moved from an unlocked position to a locked position. The operation of electromagnets is well known in the art and will not be discussed in detail.

An exploded view of the differential locking mechanism 124 is shown in FIG. 6. The coil 128 includes mount portions 136 that cooperate with fastener and nut assemblies 138 to attach the coil 128 to a portion of the carrier or axle housing 111. The coil 128 forms a bore 140 in which one end of the shift collar 126 is received. A resilient return member 142, such as a coil spring, spring discs, or other similar mechanism, cooperates with a washer 144 to return the shift collar 126 to an unlocked position once the coil 128 is no longer energized. A microswitch 146 and associated attachment nut 148 are also included in the differential locking mechanism 124 to monitor and inform the driver of the status of the differential 116. Thus, the number of components for the differential locking mechanism 124 are reduced by over half when compared to the traditional air actuated design.

Figure 7:
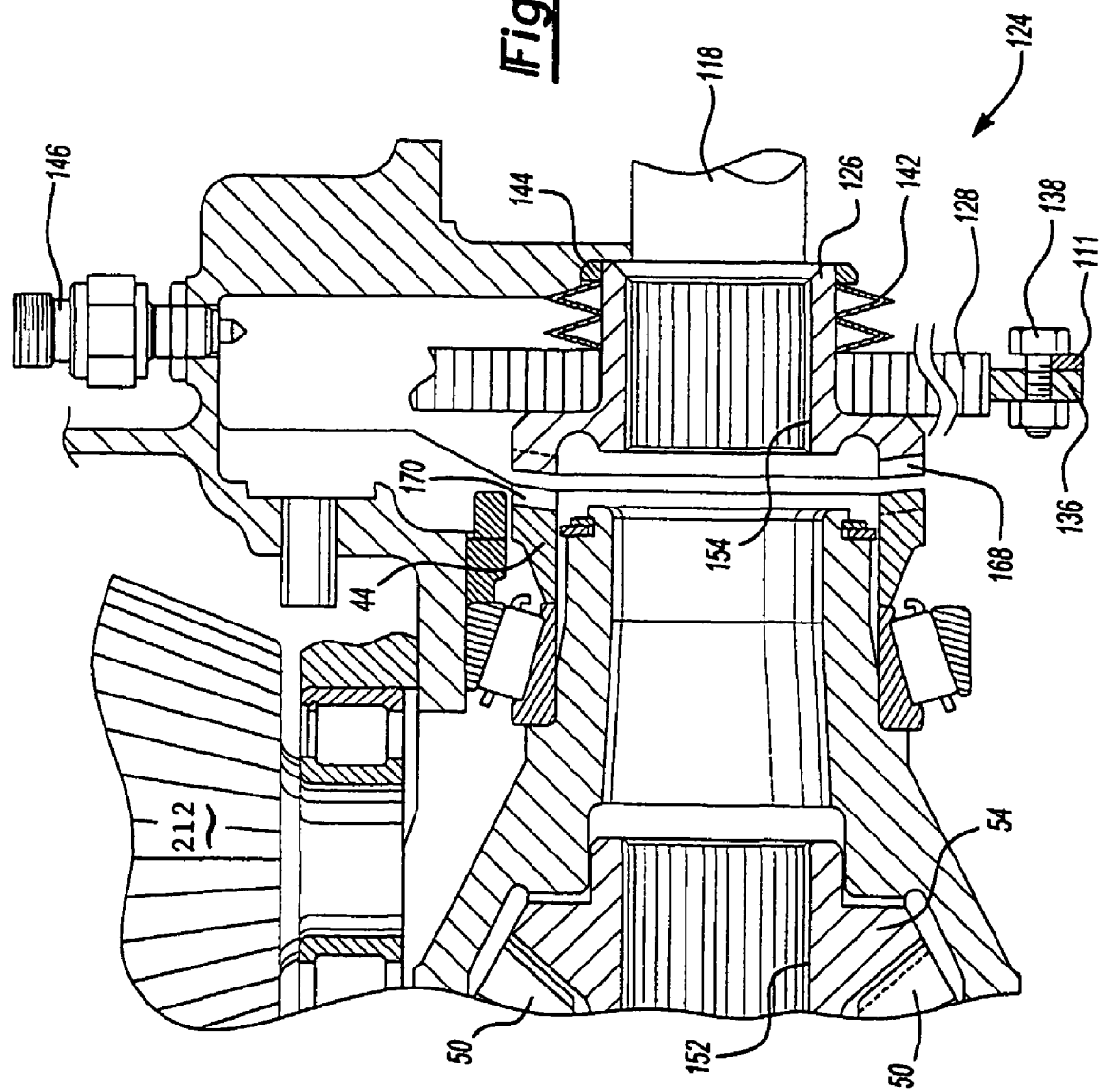
FIG. 7 is a cross-sectional view, partially broken away, of a differential incorporating the differential locking mechanism of FIG. 6 shown in a disengaged position.

FIG. 7 shows the differential locking mechanism 124 in the unlocked or disengaged position with the coil 128 in an unenergized state. The shift collar 126, splined to the axle shaft 118 in a manner similar to that described above, is positioned outboard of and is disengaged from the differential case 44.

FIG. 8 shows the differential locking mechanism 124 in the engaged or locked position. In this position, the coil 128 is energized via the power source 130, which moves the shift collar 126 linearly in an inboard direction along the lateral axis 122 until a spline attachment 150 is achieved with the differential case 44.

The axle shaft 118 includes an inboard set of splines 152, closest to the differential 116, and an outboard set of splines 154. The inboard set of splines 152 are engaged with one differential side gear 54, while the outboard set of splines 154 cooperate with the shift collar 126. The shift collar 126, although engaged with the outboard set of splines 154 in an unlocked position (shown in FIG. 7) is not engaged with the differential case 44, thus the outboard set of splines 154 will rotate at the same speed as the respective side gear 54 when the differential 116 is in an unlocked or disengaged position allowing the main differential to operate in a normal manner. When the input command 134 is issued, the power source 130 is energized, which causes the shift collar 126 to move towards the differential 116. This allows the shift collar 126 to engage with the differential case 44, while still remaining engaged with the axle shaft outboard set of splines 154 to achieve the locked position (shown in FIG. 8). Power transfer through the differential 116 is now achieved through the locked differential case 44, differential gear assembly 42, and both axle shafts 118 together, rather than through the differential gear assembly 42 alone.

The shift collar 126 is shown in greater detail in FIG. 9. The shift collar 126 includes an inboard end 160 and an outboard end 162 that is smaller in diameter than the inboard end 160. A central bore 164 extends through the shift collar 126 and receives the axle shaft 118. The central bore 164 includes a splined surface 166 that mates with the outboard set of splines 154 of the axle shaft 118. The inboard end 160 includes a splined surface 168 that engages a mating splined surface 170 on the differential case 44 indicated at 150 (see FIGS. 7 and 8).

The washer 144 is mounted to the outboard end 162 of the shift collar 126. The washer 144, shown in greater detail in FIG. 10, includes a central bore 172 that is received over the 126. A plurality of slots 174 are formed about the circumference of the washer 144 which is greater in diameter than the outboard end 162 but smaller in diameter than the inboard end 160. The resilient return member 142 reacts between the washer 144 and the coil 128 to return the shift collar 126 to the unlocked position.

The method for controlling the differential locking mechanism 124 for the drive axle 108 includes the steps of energizing the coil 128, which surrounds a portion of the outboard end 162 of the shift collar 126; and in response to energizing the coil 128, moving the shift collar 126 from the unlocked position where speed differentiation between the pair axle shafts 118 is permitted under predetermined conditions to a locked position where both of the axle shafts 118 rotate at a common speed by fixing the shift collar 126 to the differential case 44. Additionally, the shift collar 126 is automatically returned to the unlocked position, i.e. is disengaged from the differential case 44, when the power supply 130 is cut from the coil 128.

The subject invention provides a simplified and effective differential lock that significantly reduces the number of components from traditional designs, reduces assembly time, and reduces cost. Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A differential locking mechanism for a drive axle comprising:
    a differential including a differential gear assembly supported within a differential case;
    a pair of axle shafts driven by said differential gear assembly for rotation about an axis;
    a shift collar movable between an unlocked position where speed differentiation between said pair of axle shafts is permitted and a locked position wherein said shift collar directly engages said differential case such that said differential case, said shift collar, and said pair of axle shafts are fixed for rotation together;
    an electronic actuator responsive to an electronic signal to move said shift collar from said unlocked position to said locked position, wherein said electronic actuator includes a coil having mount portions to receive fasteners to directly attach said coil to a carrier housing; and
    a resilient member that returns said shift collar to said unlocked position, said resilient member surrounding an outer end portion of said shift collar.

2. The differential locking mechanism as set forth in claim 1 wherein said coil surrounds said shift collar, and wherein said electronic signal powers said coil to move said shift collar.

3. The differential locking mechanism as set forth in claim 2 wherein said differential case includes a first case half and a second case half and wherein said electronic actuator selectively moves said shift collar to engage one of said first and second case halves.

4. The differential locking mechanism as set forth in claim 2 wherein said resilient member automatically returns said shift collar to said unlocked position when said coil is not powered.

5. The differential locking mechanism as set forth in claim 4 wherein said resilient member reacts between said coil and an outboard end of said shift collar.

6. The differential locking mechanism as set forth in claim 5 including a washer fixed to said outboard end for reacting with said resilient member.

7. The differential locking mechanism as set forth in claim 2 wherein said shift collar includes an inboard end having a splined surface and an outboard end for supporting said resilient member, said inboard end having a greater diameter than said outboard end.

8. The differential locking mechanism as set forth in claim 7 wherein said coil defines a central bore surrounding said shift collar at said outboard end, said shift collar moving in an inboard direction in response to said coil being powered via said electronic signal such that said splined surface of said inboard end engages a mating splined surface formed on said differential case such that said differential case and said pair of axle shafts are locked together for rotation about said axis.

9. The differential locking mechanism as set forth in claim 1 wherein said shift collar includes a first end having a splined surface to engage a mating splined surface of said differential case and a second end opposite of said first end, said first end having a greater diameter than said second end, and wherein a washer is fixed to said second end such that said resilient member reacts between said washer and said electronic actuator.

10. The differential locking mechanism as set forth in claim 9 wherein said coil is positioned axially between said first end and said washer, and wherein said resilient member is positioned axially between said washer and said coil.

11. A drive axle assembly with a locking differential comprising:
    a driving input defining a longitudinal axis;
    a carrier including a pinion gear driven by said driving input and a ring gear in meshing engagement with said pinion gear;
    a differential including a differential gear assembly supported by a differential case wherein said ring gear is attached to said differential case to drive said differential gear assembly;
    a pair of axle shafts driven by said differential gear assembly for rotation about a lateral axis, said lateral axis being transverse to said longitudinal axis;
    an axle housing for substantially enclosing said carrier and said pair of axle shafts; and
    a locking mechanism including a shift collar and an electronic actuator for controlling movement of said shift collar wherein said shift collar is movable between an unlocked position where speed differentiation between said pair of axle shafts is permitted and a locked position wherein said shift collar is moved into locking engagement with said differential case in response to an electronic signal such that said differential case, said shift collar, and said pair of axle shafts are fixed for rotation together about said lateral axis, and wherein said locking mechanism includes a resilient member that returns said shift collar to said unlocked position, said resilient member surrounding said shift collar and reacting between said electronic actuator and said shift collar, and wherein said electronic actuator comprises a coil surrounding said shift collar wherein said electronic signal powers said coil to move said shift collar, and wherein said coil includes mount portions to receive fasteners to directly secure said coil to said axle housing.

12. The drive axle assembly as set forth in claim 11 wherein said shift collar includes an inboard end having a splined surface and an outboard end, said inboard end having a greater diameter than said outboard end and wherein said coil defines a central bore surrounding said shift collar at said outboard end, said shift collar moving in an inboard direction in response to said coil being powered via said electronic signal such that said splined surface of said inboard end engages a mating splined surface formed on said differential case such that said differential case is locked to said pair of axle shafts, and wherein a washer is fixed to said outboard end such that said resilient member reacts between said washer and said coil, said coil being positioned axially between said inboard end of said shift collar and said washer.

* * * * *